E. V. CALDWELL.
WIRE STRETCHER, FENCE STRAIGHTENER, AND VEHICLE JACK.
APPLICATION FILED MAY 26, 1921.
1,432,590. Patented Oct. 17, 1922.
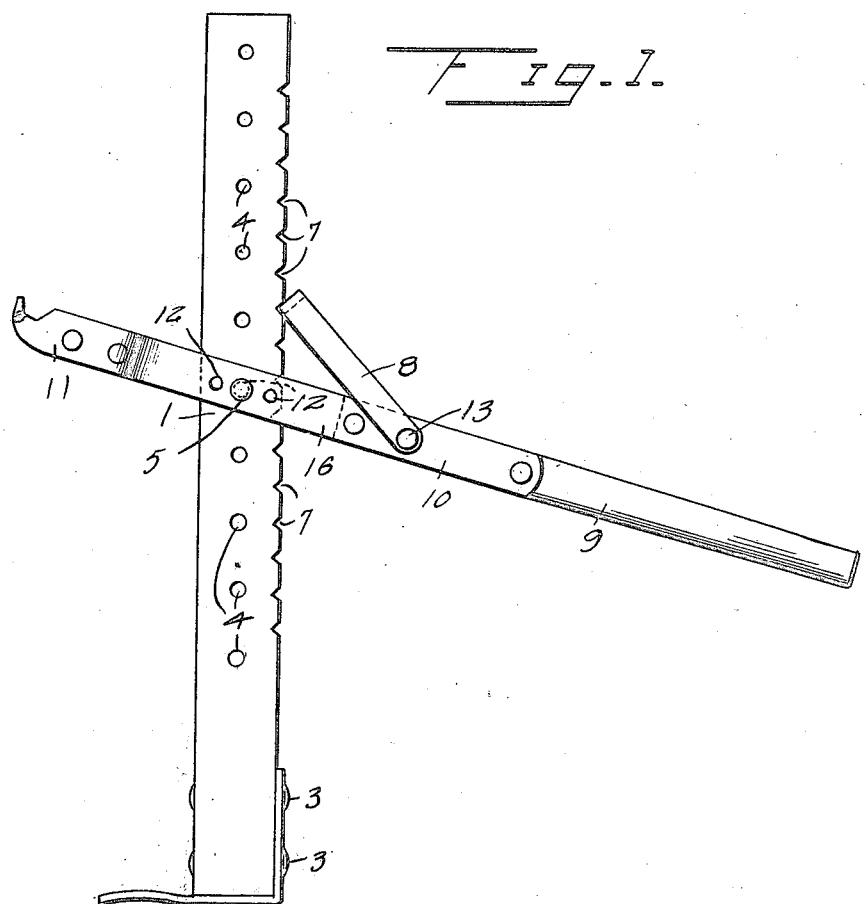
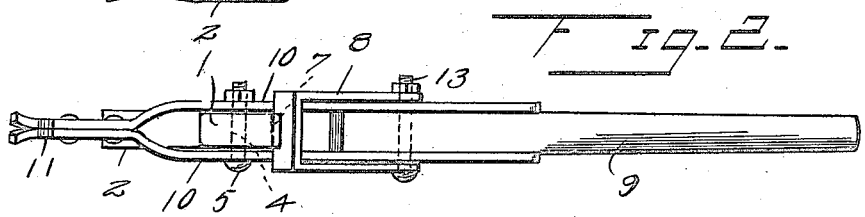
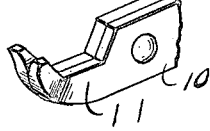
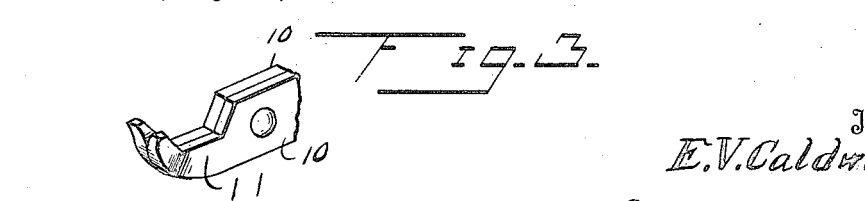
Inventor
E. V. Caldwell.

Patented Oct. 17, 1922.

1,432,590

UNITED STATES PATENT OFFICE.

EMERY V. CALDWELL, OF KENNETT, MISSOURI.

WIRE STRETCHER, FENCE STRAIGHTENER, AND VEHICLE JACK.

Application filed May 26, 1921. Serial No. 472,625.

*To all whom it may concern:*

Be it known that I, EMERY V. CALDWELL, a citizen of the United States, residing at Kennett, in the county of Dunkin and State of Missouri, have invented certain new and useful Improvements in a Wire Stretcher, Fence Straightener, and Vehicle Jack; and I do hereby declare the following to be a full, clear, and exact description of the invention, such as will enable others skilled in the art to which it appertains to make and use the same.

The invention relates to a tool whereby force may be conveniently and effectively applied for lifting loads or spreading or drawing together parts to be moved.

The tool embodies a bar, a lever adjustable and detachable relatively to the bar and a pawl mounted on the lever and adapted to cooperate with the bar to hold the lever in the required adjusted position against the force sustained thereby when in action.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is an elevation of a tool embodying the invention.

Figure 2 is a top plan view thereof, and

Figure 3 is a detail view of the lever.

Corresponding and like parts are referred to in the following description and designated in the several views of the drawings by like reference characters.

The tool comprising a bar 1 which may be of any required dimension and of any desired material. A foot 2 is provided at one end of the bar 1 and consists of an L-shape flange having one member overlapping the extremity of the bar 1 and the other member extending along an edge of the bar and secured thereto by rivets or transverse fastenings 3. A series of openings 4 are provided along the length of the bar 1 to receive the pivot 5 of a lever 16. The bar is provided along one edge with a plurality of notches 7 which cooperate with a pawl 8 whereby to secure the lever 16 in the required adjusted position against the load or the force sustained thereby.

The lever 16 comprises a handle 9 preferably of wood and metal straps 10 secured to opposite sides of the handle 9. The forward portions of the straps 10 are brought together and riveted or otherwise secured and terminate in a hook 11 having its bill forming a claw to engage barbed wire or similar articles. The metal straps 10 are spaced intermediate their ends to receive the bar 1 and have openings 12 in coincident relation to receive the pivot 5 whereby the effective leverage may be varied. The pawl 8 is preferably of U-form and the ends of its side members embrace the lever and are connected thereto by means of a pivot fastening 13 which extends through registering openings formed in the handle 9 and metal straps 10. The free or closed end of the pawl 8 is adapted to engage the notches 7 and hold the lever in the required adjusted position when sustaining a load or otherwise in active operation.

When the device is used in the capacity of a vehicle jack the bar 1 is spaced in upright position and its foot 2 resting upon a suitable support to prevent its sinking in comparatively soft ground. The hooked end 11 of the lever 16 is engaged with the axle or other part to be lifted. Upon depressing the opposite end of the lever 6 the hook end 11 is elevated and the load lifted. The free end of the pawl 8 engages one of the notches 7 and sustains the load as will be readily appreciated.

When the device is used as a fence straightener the foot 2 is engaged with the lowermost wire and the hook 11 of the lever 6 with the top most wire and upon operating the lever 6 the desired result may be effected. For stretching a barbed wire the lever 6 is disengaged from the bar 1 and placed against the desired fence post, the latter serving as a fulcrum. The barbed wire is engaged by the small end of the hook 11, the wire being stretched or drawn taut by operating the lever 6 in a manner to exert a pulling force thereon. If the fence wire is devoid of barbs, it may be engaged with the hook end of the lever 6 by wrapping the same therearound.

Having thus described the invention, what I claim is:—

A device of the character specified comprising a bar having openings at intervals in its length and provided along one edge with a plurality of notches, the lever comprising a handle and metal straps secured to opposite sides of the handle and having their forward ends brought together and then secured and terminating in a hook, the bar being received in the space formed between said metal straps, a pivot fastening adjustably connecting the lever with the bar and a pawl pivotally connected with the lever and comprising elements embracing opposite sides thereof.

In testimony whereof I affix my signature in presence of two witnesses.

EMERY V. $\overset{\text{his}}{\times}$ CALDWELL.
$\phantom{EMERY V.}$ mark

Witnesses:
H. L. CANON,
BEATRICE BIGGS.